United States Patent
Yamawaki

(10) Patent No.: US 8,314,824 B2
(45) Date of Patent: Nov. 20, 2012

(54) OPTICAL SCANNING APPARATUS AND IMAGE FORMING APPARATUS USING THE SAME

(75) Inventor: Takeshi Yamawaki, Tokyo (JP)

(73) Assignee: Canon Kabushiki Kaisha (JP)

( * ) Notice: Subject to any disclaimer, the term of this patent is extended or adjusted under 35 U.S.C. 154(b) by 472 days.

(21) Appl. No.: 12/703,460

(22) Filed: Feb. 10, 2010

(65) Prior Publication Data

US 2010/0202799 A1    Aug. 12, 2010

(30) Foreign Application Priority Data

Feb. 10, 2009  (JP) ................. 2009-028439

(51) Int. Cl.
*B41J 2/435*   (2006.01)
*B41J 15/14*   (2006.01)
*B41J 27/00*   (2006.01)

(52) U.S. Cl. ........ 347/224; 347/241; 347/256; 347/258; 347/261

(58) Field of Classification Search ............. 347/224, 347/258, 261
See application file for complete search history.

(56) References Cited

FOREIGN PATENT DOCUMENTS

| JP | 2-181712 A | 7/1990 |
|---|---|---|
| JP | 8-304724 A | 11/1996 |
| JP | 08304724 | * 11/1996 |

* cited by examiner

*Primary Examiner* — Uyen Chau N Le
*Assistant Examiner* — Kajli Prince
(74) *Attorney, Agent, or Firm* — Rossi, Kimms & McDowell LLP

(57) ABSTRACT

An optical scanning apparatus, including an incident system that allows a beam from the light source to enter to deflector; and an imaging system that images the beam deflected by the deflector on a scanning surface, in which the incident system includes a first and second systems, the first system includes first and second elements each having a positive power with rotational symmetry, the light source is positioned at a shorter distance from the front focus position of the first element, the first element is formed integrally as a unit, powers of the second element and the first system, magnifications within main and sub-scanning sections of entire system, and focus movement within the main and sub-scanning sections on the scanning surface when the second element is moved in the optical axis direction are appropriately set.

7 Claims, 6 Drawing Sheets

OPTICAL SCANNING APPARATUS AND IMAGE FORMING APPARATUS USING THE SAME

BACKGROUND OF THE INVENTION

1. Field of the Invention

The present invention relates to an optical scanning apparatus and an image forming apparatus using the same, and is suitable for an image forming apparatus, such as a laser beam printer, a digital copying machine, or a multi-function printer, employing an electrophotography process.

2. Description of the Related Art

Hitherto, in an optical scanning apparatus of a laser beam printer (LBP) or of a digital copying machine, a light beam optically modulated and emitted from light source unit in accordance with an image signal is periodically deflected by an optical deflector (deflecting unit) constituted by a rotary polygon mirror (polygon mirror). Then, the deflected light beam is converged into a spot-like shape on a surface of a photosensitive recording medium (photosensitive drum) by an imaging optical system having an fθ characteristic, and the surface thereof has been optically scanned, to thereby effect image recording.

In the optical scanning apparatus of this type, adjustment of a focus position on a surface to be scanned is carried out by moving along an optical axis at least a part of lenses that constitute an incident optical system. The various optical scanning apparatus described above have conventionally been proposed (refer to Japanese Application Laid-open No. H02-181712 and Japanese Application Laid-open No. H08-304724).

Providing a lens for adjusting the focus position to an incident optical system includes a problem in which, there is given a matter that the scanning optical system which aims to attain high resolution, that is, an optical system for forming a small spot on the surface to be scanned, has a small focal range, i.e., a small depth of focus, at which a satisfactory spot may be obtained.

As factors of deviations of the focus position, the following two factors are given:

(1) initial focus deviation due to the precision in positioning of parts at the time of assembling of the scanning optical system, or surface accuracy of optical components; and
(2) focus deviation due to positional displacements of structural parts accompanied by temperature change or change in characteristics of the optical components. If the depth of focus is small, the focus deviation causes due to the above-mentioned factors (1) and (2). As a result, the surface to be scanned goes out of the depth of focus.

To address the problems described above, for example, the construction disclosed in the fifth embodiment (FIGS. 7 and 8) of Japanese Patent Application Laid-open No. H02-181712 is illustrated in FIGS. 8 and 9.

Japanese Patent Application Laid-open No. H02-181712 points out that, as a factor of causing the focus deviation accompanied by the temperature change, in a case where a semiconductor laser is used for the light source unit, the wavelength fluctuates depending on temperature, and chromatic aberration of the lens occurs, resulting in the deviation of the focus position. Besides, as factors of causing an initial focus deviation, pointed out are a positional displacement between the surface to be scanned (photosensitive drum) and the optical scanning apparatus, and processing precision of the optical components (surface accuracy).

As a counter measure against those problems, Japanese Patent Application Laid-open No. H02-181712 discloses a conversion optical system (collimator optical system) La constituted by three-lens/two-unit system, including in order from the light source side a cemented lens 2 having a negative power and formed by two pieces of lenses including a positive lens and a negative lens; and an aspherical lens 4 having a positive power. By configuring the third lens 4 as an aspherical lens, there is constructed an excellent collimator optical system La capable of further suppressing the spherical aberration, The collimator optical system, which is generally constructed by a plurality of lenses, is typically constructed by lens units having positive and negative powers in view of correcting the spherical aberration. In Japanese Patent Application Laid-open No. H02-181712, the wavelength of a laser light oscillated by a laser light source (light source unit) 1 shifts due to the change in temperature, and the chromatic aberration of the lens causes the focus deviation. For this reason, the cemented lens 2 is rendered to have a function of over-correcting achromatization, to thereby cancel the chromatic aberration caused in the imaging optical system 6.

In addition, the cemented lens 2 on the light source unit side has a construction so as to be adjustable in an optical axis direction, and the positional displacement between the surface to be scanned (photosensitive drum) 7 and the optical scanning apparatus, and uniform focus deviation of a scanning lens 6 from a designed value caused by the processing error are corrected, to thereby align the focus position to a center of the depth of focus.

Note that, a ratio between the power of the cemented lens 2 as the adjustment lens and the power of the entire system of the three-lens/two-unit system is as small as −0.2, and hence the adjustment sensitivity is low, and which makes the adjustment easier.

On the other hand, Japanese Patent Application Laid-open No. H08-304724 proposes a method, which achieves the reduction of the sensitivity for the focus adjustment by constructing the collimator optical system by one collimator lens and one adjustment lens, and by moving the adjustment lens in the optical axis direction.

FIGS. 9 to 11 represent a schematic view of a main portion of the optical scanning apparatus, and cross-sections of the lenses of the optical system, respectively, which are disclosed as FIGS. 1, 1A, and 1B of the first embodiment in Japanese Application Laid-open No. H08-304724.

In Japanese Patent Application Laid-open No. H08-304724, the light source unit 1 is disposed at a position closer by 1 mm to the collimator lens from the focal length of the collimator lens 2. Further, the light beam, which has entered into the collimator lens 2, is converted into a diverged light beam after passage therethrough, and is converted into parallel light beams by a spherical lens 15 having convex (positive) power, which is arranged in the optical deflector 5 side of the collimator lens 2. The converted parallel light beams is imaged into a spot on the surface to be scanned (image plane) 7 via the cylindrical lens 4 and the optical deflector 5 by the imaging lens 6. The focal length f of the collimator lens 2 is 8 mm, the focal length of the spherical lens 15 is 172 mm, an interval between the collimator lens 2 and the spherical lens 15 is 100 mm, and the focal length of the imaging lens 6 is 480 mm.

In the construction, a movement amount of the spherical lens 15 becomes 0.64 mm so as to deal with the focus deviation of 5 mm on the surface to be scanned 7. The movement amount of the collimator lens 2, in a case where the spherical lens 15 does not exist, was 0.0014 mm, and hence it results in reducing the adjustment sensitivity by 1/460.

The above-mentioned Japanese Application Laid-open No. H02-181712 and Japanese Application Laid-open No. H08-304724 do not disclose at all the adjustment sensitivity within the sub-scanning section if a lens which is adjustable in the optical axis direction is caused to move.

Generally, if the spherical lens is caused to move, the focus position on the image plane deviates in both the main scanning direction and the sub-scanning direction, thereby being not able to perform focus adjustments in the main scanning direction and the sub-scanning direction, individually, which being a problem.

The amount of focus deviation in the sub-scanning direction which occurred when the focus adjustment in the main scanning direction was carried out, can be adjusted in the sub-scanning direction by adjusting the cylindrical lens. However, the focus adjustment in the main scanning direction causes the focus deviation in the sub-scanning direction, resulting in increase in adjustment amount of the cylindrical lens. This makes an adjustment range of the cylindrical lens longer, and requires the cylindrical lens securing an accurate posture during the adjustment throughout a long distance. As a result, a seating surface is required to be processed with high precision.

Japanese Patent Application Laid-open No. H08-304724 also discloses a case where a cylindrical lens having a power only in the main scanning direction is employed in place of the spherical lens. However, it is a problem that the production of the cylindrical lens is more difficult than the spherical lens.

SUMMARY OF THE INVENTION

It is an object of the present invention to provide an optical scanning apparatus capable of suppressing an adjustment sensitivity of an optical element in an incident optical system, and of correcting a focus deviation on a surface to be scanned in an initial adjustment with high precision by a simple construction, and an image forming apparatus using the same.

According to the present invention, there may be realized the optical scanning apparatus capable of suppressing the adjustment sensitivity of the optical element in the incident optical system, and of correcting the focus deviation on the surface to be scanned with high precision by the simple construction in the initial adjustment, and the image forming apparatus using the same.

Further features of the present invention will become apparent from the following description of exemplary embodiments with reference to the attached drawings.

DESCRIPTION OF THE EMBODIMENTS

Hereinafter, description is made of embodiments of the present invention with reference to drawings.

First Embodiment

Figure 1:
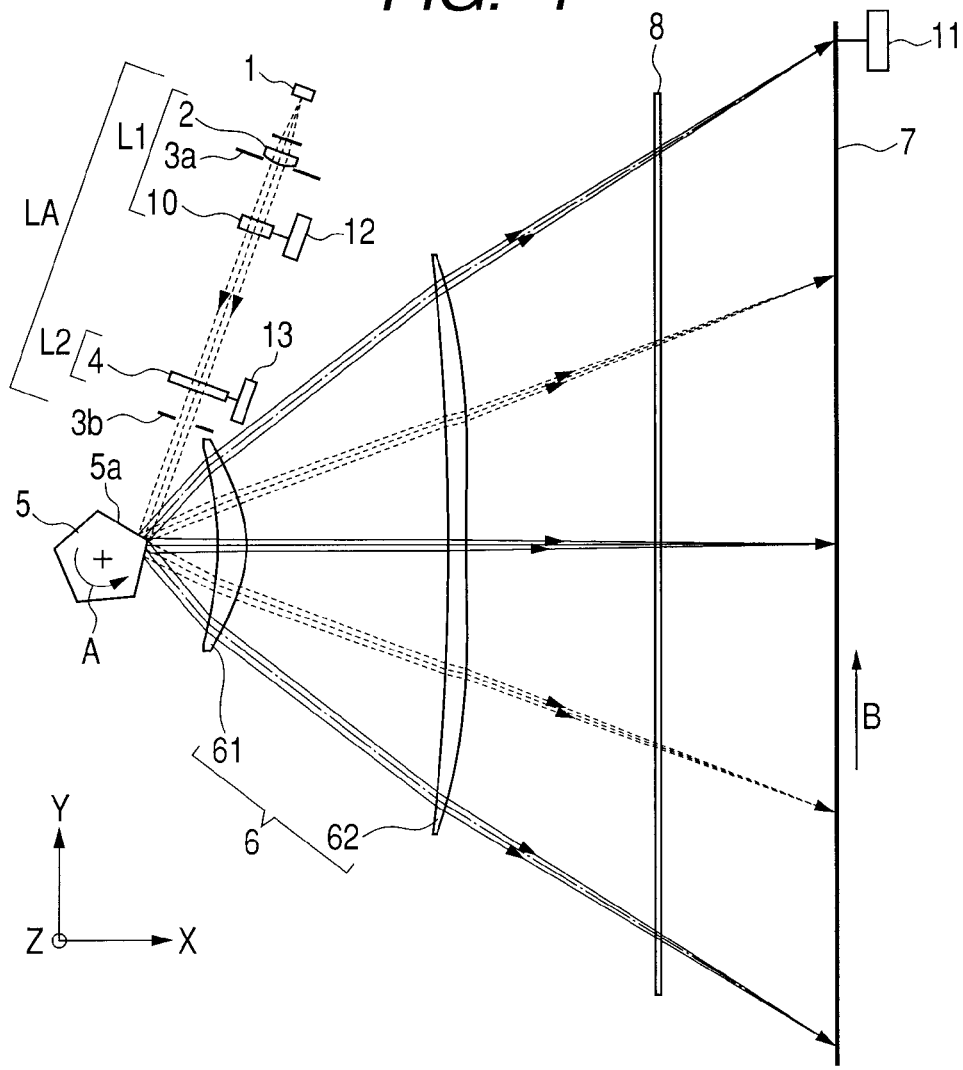
FIG. 1 illustrates a main scanning sectional view according to a first embodiment of the present invention.
Figure 2:
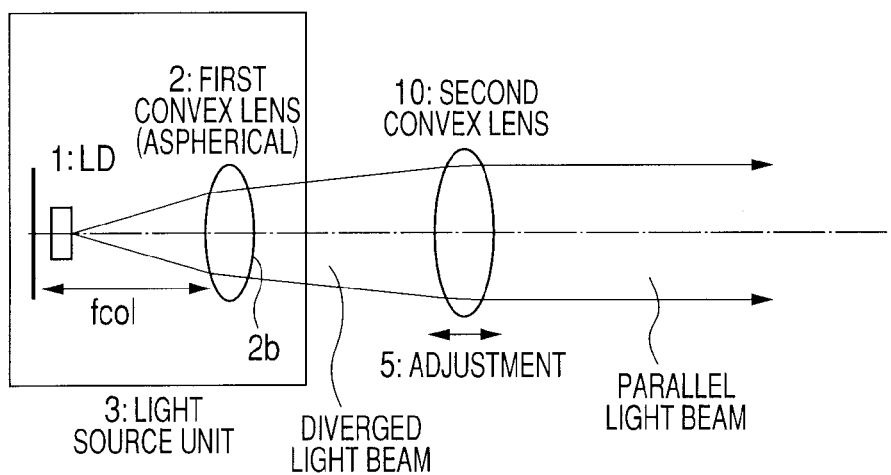
FIG. 2 is a sectional view illustrating a main portion of a first optical system according to the first embodiment of the present invention.

FIG. 1 illustrates a main portion sectional view in a main scanning direction (main scanning sectional view) according to the present invention. FIG. 2 illustrates a main portion sectional view in a sub-scanning direction (sub-scanning sectional view) illustrated in FIG. 1 in a sub-scanning direction.

Note that, in the following description, the sub-scanning direction (Z direction) is a direction parallel to a rotational axis of deflection unit. The main scanning section is a section whose normal is the sub-scanning direction (direction parallel to the rotational axis of the deflection unit). The main scanning direction (Y direction) is a direction in which a light beam deflected for scanning by the deflection unit is projected on the main-scanning section. The sub-scanning section is a section in which the main scanning direction is a normal line.

In the figures, light source unit 1 includes a plurality of light emitting portions (light emitting points), and is constituted by a multi-beam laser having a center of an oscillation wavelength at 670 nm. The light source unit 1 is disposed at shorter distance than the front focus position (focus position on light source unit 1 side) of a first optical element 2 described later.

The multi-beam laser 1 of this embodiment is provided with a cover glass, which serves as a light emitting window of a package, and is a thin, parallel and flat plate, and the light is emitted through the window.

An incident optical system LA includes: a first optical system L1 which converts the light beam emitted from the light source unit 1 to parallel light beams; a second optical system L2 which converges the light beams emitted from the first optical system L1 in a sub-scanning direction; and a first stop 3a and a second stop 3b.

Further, the incident optical system LA has an optical axis arranged within a plane which is parallel to a plane vertical to a rotation axis of an optical deflector 5 described below, and guides the light beam emitted from the light source unit 1 to a deflection surface 5a of the optical deflector 5.

The first optical system L1 includes a fist optical element 2 having a positive power in the main scanning direction and being rotational symmetry in the main scanning section and a second optical element 10 having a positive power in the sub-scanning direction and being rotational symmetry in the sub-scanning section.

The first optical element 2 is formed of a collimator lens (aspherical lens) having an aspherical shape (hereinafter, referred to as "first convex lens 2"), and converts the diverged light beams emitted from the light source unit 1 into light beams, which are close to the parallel light beams.

Besides, the first convex lens 2 and the light source unit 1 are integrated into a unit to constitute a light source unit 3.

The first stop 3a is provided to an exit surface of the first convex lens 2, and restricts a passing light beam within the sub-scanning section (sub-scanning direction) to adjust a shape of the beam.

The second optical element 10 is constituted by a collimator lens (hereinafter, referred to as "second convex lens 10"), is configured adjustable in an optical axis direction, and converts the light beam which is shaped and output from the first stop 3a, into the parallel light beams.

The second convex lens 10 of this embodiment is held by a lens barrel (not shown), and the lens barrel is moved by a drive mechanism 12 toward the optical axis direction to perform the focus adjustment within the main scanning section (main scanning direction) on the surface to be scanned 7.

The second optical system L2 is formed of a cylindrical lens 4 serving as a third optical element, and has a predetermined power within the sub-scanning section only. The second optical system L2 images as a line image the light beam which has passed through the second convex lens 10 on a deflection surface (reflection surface) 5a of the optical deflector 5 described later within the sub-scanning section. The cylindrical lens 4 is configured movable in the optical axis direction by the drive mechanism 13.

The second stop 3b is arranged in the vicinity of the deflection surface 5a of the optical deflector 5, and restricts the passing light beam within the main scanning section to adjust a shape of the beam.

In this embodiment, the second stop 3b is arranged in the vicinity of the deflection surface 5a so that the focal lines of the light beams emitted from the plurality of the light emitting points are restrained from being separated on the deflection surface 5a toward the main scanning direction. If the second stop 3b is not arranged in the vicinity of the deflection surface 5a, deviations of writing beginning positions of the plurality of beams become larger. As a result, in order to prevent vignetting of the focal line, the deflection surface unfavorably becomes larger.

The optical deflector 5 serving as deflecting unit is constituted by, for example, a polygon mirror having five surfaces (rotary polygon mirror), and is rotated at a constant speed in a direction indicated by an arrow A of the figure by drive unit such as a motor (not shown).

The imaging optical system (fθ lens system) 6 having an fθ characteristic includes the first imaging lens 61 and the second imaging lens 62.

The imaging optical system 6 images the light beam based on image information which is deflected by the optical deflector 5 for scanning on the photosensitive drum surface 7 serving as the surface to be scanned, and provides, within the sub-scanning section, a conjugate relationship between the deflection surface 5a of the optical deflector 5 and the photosensitive drum surface 7, to thereby effect an optical face tangle error correction.

Note that, hereinafter, the imaging optical system 6 is referred to "fθ lens system 6", a first imaging lens 61 is referred to "first fθ lens 61", and the second imaging lens 62 is referred to "second fθ lens 62."

A dust-proof glass 8 is provided so as to prevent dust, toner, or the like from entering into an inside of the optical scanning apparatus.

Reference numeral 7 denotes a photosensitive drum surface (recording medium surface) serving as the surface to be scanned.

In this embodiment, the light beam emitted from the light source unit 1 based on the image information is converted into the light beams close to the parallel light beams by the first convex lens 2. Then, a diameter of the light beam in the sub-scanning direction is limited by the first stop 3a, and further the light beam is converted into the parallel light beams by the second convex lens 10 to enter the cylindrical lens 4. Among the light beams incident on the cylindrical lens 4, within the main scanning section, the diameter of the light beam in the main scanning direction is limited by the second stop 3b. Further, within the sub-scanning section, the light beams are converged to be imaged into a line image (longitudinal line image in the main scanning direction) on the deflection surface 5a of the optical deflector 5. Then, the light beam, which is deflected for scanning on the deflection surface 5a of the optical deflector 5, is imaged into a spot shape on the photosensitive drum surface 7 by the fθ lens system 6, and through rotation of the optical deflector 5 in a predetermined direction A, the photosensitive drum surface 7 is optically scanned in the main scanning direction as a constant speed. With this, the image is recorded on the photosensitive drum surface 7 serving as a recording medium.

Tables 1a to 1e show various characteristics of the fθ lens system 6 in this embodiment.

The aspherical shape in the main scanning section of each of the lens surfaces of the first fθ lens 61 and the second fθ lens 62 constituting the fθ lens system 6 is expressed by the following equation, $$x = \frac{y^2/R}{1 + (1 - (1+k)(y/R)^2)^{1/2}} + \sum_{i=4}^{16} B_i y^i \quad \text{(a)}$$

where an intersections between each lens surface and the optical axis is taken as an origin, the optical axis direction is taken as an X axis, an axis orthogonal to the optical axis in the main scanning section is taken as a Y axis, an axis orthogonal to the optical axis in the sub-scanning section is taken as a Z axis, R represents a curvature radius, k represents an eccentricity, and $B_i$ (i=4, 6, 8, 10 . . . ) represent aspherical coefficients.

Here, if the coefficient is different between the plus side (upper side of figure) and the minus side (lower side of figure) in Y direction, a subscript u is attached to the coefficient on the plus side while a subscript 1 is attached to the coefficient on the minus side.

Further, the aspherical shape in the sub-scanning section of each lens surface of the incident surface and the exit surface of the first fθ lens 61 and the incident surface of the second fθ lens 62, where the first and second fθ lenses 61 and 62 constitutes the fθ lens system 6, is expressed as follows, $$S = \frac{z^2/r'}{1 + (1 - (z/r')^2)^{1/2}} \quad \text{(b)}$$

where S represents a sagittal shape defined in a plane, which includes a surface normal to a meridian line at an arbitrary point on a meridian line, and is perpendicular to the main scanning section.

Here, the curvature radius r' in the sub-scanning section changes continuously with the Y-coordinate of the lens surface, and it is expressed as follows.

$$r' = r\left(1 + \sum_{j=2}^{10} D_j y^j\right) \quad (c)$$

The aspherical shape in the sub-scanning section of the exit surface of the second fθ lens 62 is expressed as follows, $$S = \frac{z^2/r'}{1 + (1 - (z/r')^2)^{1/2}} \quad (d)$$

where S is a sagittal shape defined in a plane, which includes a surface normal to a meridian line at an arbitrary point on a meridian line, and is perpendicular to the main scanning section.

Here, the curvature radius r' in the sub-scanning section changes continuously with the Y-coordinate of the lens surface, and it is expressed as follows.

$$\frac{1}{r'} = \frac{1}{r} + \sum_{j=2}^{10} D_j y^j \quad (e)$$

In the above-mentioned equations (b) to (e), r represents a curvature radius in the sub-scanning section on the optical axis, and $D_j$ (j=2, 4, 6, 8, 10 . . . ) represent variation factors of the curvature radius in the sub-scanning section.

Here, if the coefficient is different between the plus side (upper side of figure) and the minus side (lower side of figure) in Y axis direction, a subscript u is attached to the coefficient on the plus side while a subscript 1 is attached to the coefficient on the minus side.

Further, the sub-scanning section has the spherical shape, the sub-scanning section changes continuously with the Y-coordinate of the lens surface, and the shape can be represented by the tenth function of Y.

In Tables 1a-1e, "E-x" means "$10^{-x}$".

TABLE 1a

Construction of Optical Scanning Apparatus

| fθ Factor Scanning Angle, Image Angle | | |
|---|---|---|
| fθ Factor | k (mm/rad) | 200 |
| fθ Lens 6 Sub-scanning Magnification | Bs | 1.176 |
| Scanning Angle | W (mm) | 335 |
| Maximum Field Angle | θ (deg) | 48 |
| Wavelength, Refractive Index | | |
| Used Wavelength | λ (nm) | 670 |
| fθ Lens 6, Refractive Index | N1 | 1.5273 |
| fθ Lens 7, Refractive Index | N2 | 1.5273 |
| Scanning Optical System, Arrangement | | |
| Polygon Deflecting Surface 5a to Lens Incident Surface 61a | d0 (mm) | 26.5 |
| Lens Incident Surface 61a to Lens Exit Surface 61b | d1 (mm) | 9.6 |
| Lens Exit Surface 61b to Lens Incident Surface 62a | d2 (mm) | 67.9 |
| Lens Incident Surface 62a to Lens Exit Surface 62b | d3 (mm) | 5.5 |

TABLE 1a-continued

Construction of Optical Scanning Apparatus

| Lens Exit Surface 62b to Surface to be scanned 7 | d4 (mm) | 126.74 |
|---|---|---|
| Polygon Deflecting Surface 5a to Surface to be scanned 7 | d total | 236.24 |
| Incident Angle (Incident Optical System) | | |
| Main Scanning Direction, Incident Angle | α (deg) | 70 |

TABLE 1b

Construction of Optical Scanning Apparatus
fθ Lens 61, Meridian Line Shape

| | Incident Surface 61a Light Source-side | Exit Surface 61b Light Source-side |
|---|---|---|
| R | −7.12389E+01 | −4.19480E+01 |
| ku | 2.17680E+00 | 6.42947E−02 |
| B4u | 3.69128E−06 | 2.77878E−06 |
| B6u | 8.27275E−11 | 1.17980E−09 |
| B8u | 1.95630E−13 | 2.10270E−13 |
| B10u | 3.54758E−17 | 2.07452E−16 |
| | Anti-Light Source-side | Anti-Light Source-side |
| kl | 2.17680E+00 | 6.42947E−02 |
| B4l | 3.69128E−06 | 2.77878E−06 |
| B6l | 8.27275E−11 | 1.17980E−09 |
| B8l | 1.95630E−13 | 2.17551E−13 |
| B10l | 3.54758E−17 | 2.02442E−16 |

TABLE 1c

Construction of Optical Scanning Apparatus
fθ Lens 62, Meridian Line Shape

| | Incident Surface 62a Light Source-side | Exit Surface 62b Light Source-side |
|---|---|---|
| R | −8.24438E+02 | 7.68E+02 |
| ku | 0.00000E+00 | −5.89704E+02 |
| B4u | 0.00000E+00 | −2.57008E−07 |
| B6u | 0.00000E+00 | 2.17131E−11 |
| B8u | 0.00000E+00 | −1.47843E−11 |
| B10u | 0.00000E+00 | 4.78126E−20 |
| | Anti-Light Source-side | Anti-Light Source-side |
| kl | 0.00000E+00 | −5.89704E+02 |
| B4l | 0.00000E+00 | −2.57008E−07 |
| B6l | 0.00000E+00 | 2.17131E−11 |
| B8l | 0.00000E+00 | −1.47843E−11 |
| B10l | 0.00000E+00 | 4.78126E−20 |

TABLE 1d

Construction of Optical Scanning Apparatus
fθ Lens 61, Sagittal Line Shape

| | Incident Surface 61a Light Source-side | Exit Surface 61b Light Source-side |
|---|---|---|
| r | −1.00000E+03 | −1.00000E+03 |
| D2u | 0.00000E+00 | 0.00000E+00 |
| D4u | 0.00000E+00 | 0.00000E+00 |
| D6u | 0.00000E+00 | 0.00000E+00 |
| D8u | 0.00000E+00 | 0.00000E+00 |
| D10u | 0.00000E+00 | 0.00000E+00 |

TABLE 1d-continued

Construction of Optical Scanning Apparatus
fθ Lens 61, Sagittal Line Shape

| | Anti-Light Source-side | Anti-Light Source-side |
|---|---|---|
| D2l | 0.00000E+00 | 0.00000E+00 |
| D4l | 0.00000E+00 | 0.00000E+00 |
| D6l | 0.00000E+00 | 0.00000E+00 |
| D8l | 0.00000E+00 | 0.00000E+00 |
| D10l | 0.00000E+00 | 0.00000E+00 |

TABLE 1e

Construction of Optical Scanning Apparatus
fθ Lens 62, Sagittal Line Shape

| | Incident Surface 62a Light Source-side | Exit Surface 62b Light Source-side |
|---|---|---|
| r | −1.00000E+02 | −2.36478E+01 |
| D2u | 0.00000E+00 | 7.00684E−05 |
| D4u | 0.00000E+00 | −1.56168E−08 |
| D6u | 0.00000E+00 | 2.15646E−12 |
| D8u | 0.00000E+00 | −1.68590E−16 |
| D10u | 0.00000E+00 | 5.61186E−21 |

| | Anti-Light Source-side | Anti-Light Source-side |
|---|---|---|
| D2l | 2.4500E−06 | 1.25282RE−4 |
| D4l | −1.68000E−10 | −1.52826E−08 |
| D6l | 0.00000E+00 | 2.83271E+12 |
| D8l | 0.00000E+00 | −3.04294E−16 |
| D10l | 0.00000E+00 | 1.06411E−20 |

Tables 2 and 3 each show the various characteristics of the incident optical system in this embodiment. Table 4 shows the spot diameters of the light beams within the main scanning section and within the sub-scanning section on the surface to be scanned, and magnifications of the entire system. Table 5 shows aspherical coefficients of the aspherical shape of the first convex lens 2.

TABLE 2

Construction of Incident System

Wavelength, Refractive Index

| Used Wavelength | λ(nm) | 670 |
|---|---|---|
| Cover Glass | N1 | 1.5134 |
| First Convex Lens 2 | N2 | 1.5798 |
| Second Convex Lens 10 | N3 | 1.5134 |
| Cylindrical Lens | N4 | 1.5273 |

Incident Optical System, Arrangement

| Light Source to Cover Glass Incident Surface | d1 | 16.692 |
|---|---|---|
| Cover Glass Thickness | d2 | 0.25 |
| Cover Glass to Convex Lens 2 Incident Surface | d3 | 4.00 |
| Convex Lens 2 Thickness | d4 | 3.98 |
| Convex Lens 2 Exit Surface to Stop 3a | d5 | 0.00 |
| Stop 3a to Convex Lens 10 Incident Surface | d6 | 20.00 |
| Convex Lens 10 Thickness | d7 | 4.00 |
| Convex Lens 10 Exit Surface to Cylindrical Lens 4 Incident Surface | d8 | 53.33 |
| Cylindrical Lens Thickness | d9 | 3.00 |
| Cylindrical Lens Exit Surface to Stop 3b | d10 | 48.00 |
| Stop 3b to Deflecting Surface | d11 | 55.50 |

TABLE 3

| | Incident Surface | | Exit Surface | | Focal Length | Combined Focal Length |
|---|---|---|---|---|---|---|
| | rm | rs | rm | rs | f | f' |
| Convex Lens 2 | 100 | 100 | −16.621 | −16.621 | 24.90 | 24.76 |
| Convex Lens 10 | ∞ | ∞ | −170.599 | −170.599 | 332.27 | |
| Cylindrical Lens | ∞ | 28 | ∞ | ∞ | 54.53 | — |

TABLE 4

| | Main Scanning | Sub-scanning |
|---|---|---|
| Spot Diameter | 45 μm | 45 μm |
| Total System Magnification | 8.03 | 2.58 |

TABLE 5

Aspherical Shape of Convex Lens 2

| | Exit Surface 2b |
|---|---|
| R | −1.66211E+01 |
| A2 | 0.00000E+00 |
| A3 | 0.00000E+00 |
| A4 | 2.30270E−05 |
| A5 | 5.83683E−08 |

The first convex lens 2 is an aspherical lens having a focal length fcol of 24.90 mm, and is produced by glass molding.

The interval between the light source unit 1 and the incident surface of the first convex lens 2 in the optical axis direction is determined from the Table 2 as follows.

$d1+d2+d3=20.942$ mm

On the other hand, the focal length fcol of the first convex lens 2 is 24.90 mm as described above. The light emitting point (light emitting portion) of the light source unit 1 is held at a position which is closer to the first convex lens 2 by 1.855 mm than a position from which a light beam emitted are to exit from the first convex lens 2 as a parallel light beam, and therefore, the light beams exiting from the first convex lens 2 are the diverged light beams close to the parallel light beams.

In this embodiment, the shape of the first convex lens 2 is spherical on the light source unit 1 side, and is aspherical of rotational symmetry with respect to the optical axis, on the counter light source unit 1 side. The $4^{th}$ and $6^{th}$ order aspheric surface terms correct the field curvature between the light emitting points of the multi beam.

The number of the light emitting points is 16, the pitch between the light emitting points is 50 μm, and a maximum distance between the light emitting points is as large as 0.75 mm. Therefore, at the light emitting point in the vicinity of the optical axis and at the light emitting point at the most outside of the axis, the field curvature is large, thereby becoming large in focus difference. The number of the light emitting points increases along with attainment of high speed operation of the device, and hence there may be expected that the maximum distance between the light emitting points becomes wider by about 1 mm.

In this embodiment, in preparation for future general use, it is constructed so that the focus difference does not cause even if the light emitting points are distributed from the optical axis by about 0.5 mm. Further, the second stop 3b is arranged in the vicinity of the deflection surface 5a, and hence the passing position of the first convex lens 2 differs largely between the light emitting points. For this reason, in order to obtain an optimum imaging performance with respect to the respective light emitting points, the $4^{th}$ and $6^{th}$ order aspheric surface terms are used to effect the correction. Note that, the aspheric coefficients in the present invention provide a larger aspherical amount than a usual amount generally used for the correction of the spherical aberration.

Definition of the aspheric surface is indicated hereinbelow.

$$X = \frac{h^2/R}{1+(1-(h/R)^2)^{1/2}} + \sum_{i=2m}^{16} A_i h^i + \sum_{i=2m+1}^{15} B_i h^i \quad (f)$$

where n=1, 2, ... 8 and m=1, 2, ... 7.

In the aspherical shape X, the intersection between the lens surface and the optical axis is taken as an origin, and the optical axis direction is taken as an X axis. The aspherical shape X has a shape defined by a sectional shape passing the optical axis at an arbitrary point on the aspheric surface.

Note that, R represents a curvature radius, h represents a distance from the optical axis within a plane perpendicular to the optical axis, and Ai and Bi each represent aspherical coefficients.

The first convex lens 2 is adjusted in its relative position with respect to the light source unit 1, and has a unit structure in which the first convex lens 2 is integrally held. Although not illustrated, the unit structure includes at least two members including a member for holding the light source unit 1 and the lens barrel for holding the lens. Further, the first convex lens 2 is subjected to positional adjustment with respect to the lens barrel in three dimensional directions (X, Y, Z), and then fixed by UV bonding. The light source unit 1 is subjected to rotation adjustment about the optical axis, and pitches projected in the sub-scanning direction of the light emitting points are adjusted so that a predetermined resolution is obtained on the surface to be scanned.

The second convex lens 10 is formed of, as shown in Table 2, a glass material having a refractive index N3=1.5134, is a convex lens of rotational symmetry about the optical axis, and has a flat surface on the light source unit 1 side and a convex surface on the other side. Further, the focal length fcol of the second convex lens 10 is as long as 332.27 mm, and the combined focal length with the first convex lens 2 is 24.76 mm.

The light beam emitted from the first and the second convex lenses 2 and 10 is converted into the parallel light beam. Even in two lens construction, the change in focal length with the first convex lens 2 is only 0.16 mm.

In this embodiment, a power of the second convex lens 10 is defined as $\Phi 2$; a power of the first optical system L1 in a main scanning direction is defined as $\Phi$; magnification of the entire system within a main scanning section is defined as $\beta m$; magnification of the entire system within a sub-scanning section is defined as $\beta s$. Further, when the second convex lens 10 is moved by a single amount in the optical axis direction, a focus movement amount within the main scanning section on the surface to be scanned 7 is defined as $\Delta dm$, and a focus movement amount within the sub-scanning section is defined as $\Delta ds$. Then, the following conditions are satisfied.

$$0.04 \leq \Phi 2/\Phi \leq 0.10 \quad (1)$$

$$\Delta ds \leq 0.2 \times \Delta dm \quad (2)$$

$$5 \leq (\beta m/\beta s)^2 \leq 15 \quad (3)$$

Next, technical meanings of the above-mentioned conditional formulae (1) to (3) are described.

Figure 3:
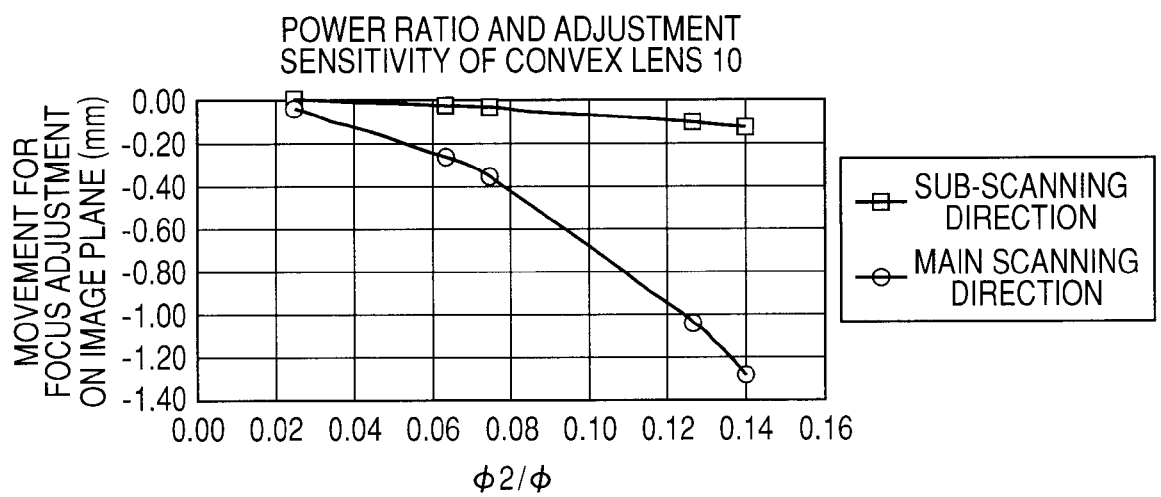
FIG. 3 shows an adjustment sensitivity of a second convex lens according to the first embodiment of the present invention.

FIG. 3 shows the adjustment sensitivity of the second convex lens 10 according to this embodiment.

In FIG. 3, the ordinate indicates the focus movement amount (sensitivity) on the surface to be scanned (image plane) when the second convex lens 10 is moved in the optical axis direction by 1 mm. The minus sign of numerals of the ordinate shows that when the second convex lens 10 is moved toward the light source unit side, the focus on the surface to be scanned is moved toward the near side (deflector side). If the second convex lens 10 is moved in the reverse direction, the sign is inverted. The sensitivity is discussed using absolute values of the ordinate irrespective of the sign. The horizontal axis indicates the power ratio of $\Phi 2/\Phi$, which is a power ratio of the power $\Phi 2$ of the second convex lens 10 to the combined power $\Phi$ of the second optical system L2.

In FIG. 3, the adjustment sensitivity becomes smaller if the ratio of $\Phi 2/\Phi$ becomes smaller, and the focus movement amount becomes 1 or less if the ratio $\Phi 2/\Phi$ becomes 0.10 or less.

On the other hand, if the second convex lens 10 is moved, the focus position within the sub-scanning section (sub-scanning direction) on the surface to be scanned is also moved. However, the sensitivity is as low as shown in FIG. 3, and is very small as 1/10 compared to the moving amount within the main scanning section (main scanning direction).

In this embodiment, the ratio of the power $\Phi$ of the second convex lens 10 to the power $\Phi$ in the main scanning direction of the first optical system L1 is:

$$\Phi 2/\Phi = 0.075,$$

which satisfies the conditional formula (1).

In addition, in this embodiment, the focus movement amount (sensitivity) $\Delta dm$ within the main scanning section in the surface to be scanned is:

$$\Delta dm = -0.36 \text{ mm},$$

and the focus movement amount (the sensitivity) $\Delta ds$ within the sub-scanning section is:

$$\Delta ds = -0.037,$$

and satisfies the conditional formula (2). It should be noted that the sensitivities $\Delta dm$ and $\Delta ds$ each are, as described above, discussed using absolute values of the ordinate irrespective of the sign.

In this embodiment, if the ratio $\Phi 2/\Phi$ becomes 0.1 or less, the focus adjustment within the main scanning section may be performed without concern for the focus deviation within the sub-scanning section. In addition, the adjustment sensitivity within the main scanning section may be made less than 0.1, the position error and the adjustment precision of the second convex lens 10 may be relaxed to about 0.5 mm.

In order to obtain an image with high image quality and high definition, it is desired that the spot diameters of the light beams on the surface to be scanned both in the main scanning direction and the sub-scanning direction be set to 50 μm or less.

In this embodiment, the spot diameters of the light beams on the surface to be scanned in both the main scanning direction and sub-scanning direction are set to 45 μm.

Figure 4:
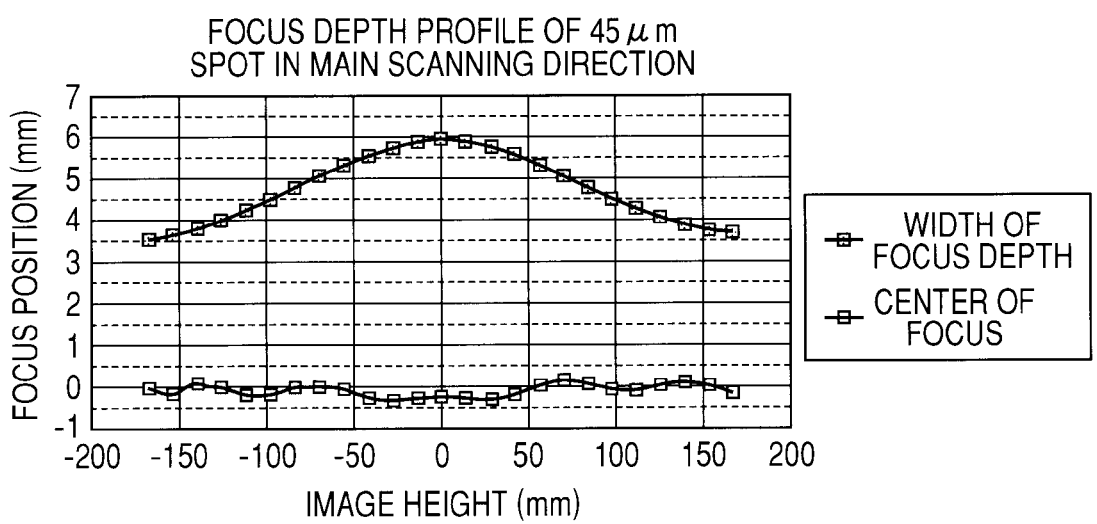
FIG. 4 shows a width of a focus depth in a main scanning direction and curvature property of the surface to be scanned according to the first embodiment of the present invention.
Figure 5:
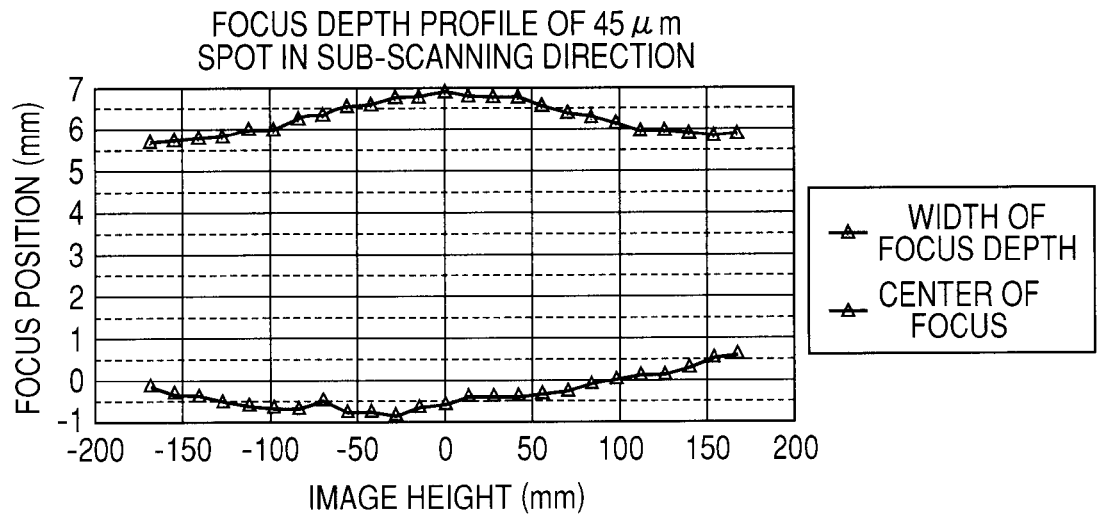
FIG. 5 shows a width of a focus depth in a sub-scanning direction and curvature property of the surface to be scanned according to the first embodiment of the present invention.

FIGS. 4 and 5 each show a width of the depth of focus and curvature performances in the main scanning direction and the sub-scanning direction according to this embodiment.

As shown in FIGS. 4 and 5, if the beam becomes small spot, the respective depth and the focus center (curvature of the surface to be scanned) become extremely narrower, in particular, the width of the depth of focus in the main scanning direction becomes narrower in proportion to the image height due to influence of the scanning image. At run end portion of the scanning region, i.e., at 162.5 mm position, the width of the depth of focus is about 3.5 mm. With respect to this width of the depth of focus, if the adjustment precision of the above-mentioned second convex lens 10 is set to 0.5 mm, the focus adjustment error within the main scanning section on the surface to be scanned becomes 0.18 mm, which is sufficiently acceptable.

Note that, if the ratio of $\Phi 2/\Phi$ becomes too smaller, the sensitivity disappears, resulting in impossible to perform the focus adjustment. In order to secure the adjustment sensitivity (focus sensitivity) of 0.1 or more, the ratio of $\Phi 2/\Phi$ is required to be 0.04 or greater.

In this embodiment, as shown in Table 4, the lateral magnification of the entire system in the main scanning direction is 3.1 times larger than that in the sub-scanning direction, which corresponds to 9.7 times in terms of the longitudinal magnification. As shown in FIG. 3, in order to make the sensitivity in the sub-scanning direction of the second convex lens 10 smaller, the ratio of the longitudinal magnification is suitably 5 times or more and 15 times or less. In other words, the above-mentioned conditional formula (3) is preferably satisfied.

If the value $(\beta m/\beta s)^2$ is smaller than the lower limit of the conditional formula (3), the sensitivity within the sub-scanning section becomes too larger, which is not preferable. Besides, if the value $(\beta m/\beta s)^2$ exceeds the upper limit of the conditional formula (3), the sensitivity within the main scanning section becomes too larger, which is also not preferable. In general, the longitudinal magnifications of the entire system in the main scanning direction are set so as to fall within a range of from 10 times to 150 times.

In this embodiment, the curvature radius of the exit surface of the second convex lens 10 is as large as about R=−170. Therefore, it is difficult to identify whether it is a flat surface or a curved surface, thereby being liable to misidentify at the time of assembling. Then, in this embodiment, a chamfered portion on the flat surface side is set as large as B0.8 or more, to thereby identify the direction of the surface.

In this embodiment, the shape of the second convex lens 10 is a spherical lens of rotational symmetry with respect to the optical axis, and hence in order to adjust the second convex lens 10 in the optical axis direction, the second convex lens 10 is mounted onto the lens barrel, in which a seating surface of a circular lens barrel is D cut (a part of outer surface of the circular lens barrel is configured to have a flat surface which is to be subjected to the seating surface), and the lens barrel is moved along the seating surface of the optical device in the optical axis direction, to thereby effect the adjustment.

Further, in this embodiment, as the second convex lens 10 has a rotation symmetry shape as described above, the lens per se is easy to achieve the optical axis precision of the lens with respect to an outer shape by a centering and edging process. If the lens per se is subjected to D cut, or is cut out into rectangular shape, the precision from the cut surface to the lens optical axis is deteriorated, resulting in being difficult to secure the height of the optical axis. On the other hand, the D cut portion of the lens barrel which holds the lens is subjected to the sliding on the sliding surface, to thereby secure a high precision of the lens optical axis finally.

In this embodiment, description is made that the adjustment sensitivity within the main scanning section of the second convex lens 10 is reduced, and the sensitivity within the sub-scanning section may be reduced to a negligible extent.

The optical configuration described above may effectively be applied not only to the initial adjustment of the device, but also to auto focusing mechanisms in which the focus position on the surface to be scanned is detected and the moving amounts and directions of the second convex lens 10 and the cylindrical lens 4 are controlled based on the detected signal of the focus position.

Accordingly, in this embodiment, focal point position detection unit 11 for detecting the focus positions within the main scanning section and the sub-scanning section on the surface to be scanned is provided in the device. Further, based on a focal point position detection signal with respect to the main scanning section from the focal point position detection unit 11, the second convex lens 10 is moved toward the optical axis direction by the drive mechanism 12, to thereby effect the focus adjustment within the main scanning section. Besides, based on a focal point position detection signal with respect to the sub-scanning section from the focal point position detection unit 11, the cylindrical lens 4 is moved in the optical axis direction by the drive mechanism 13, to thereby effect the focus adjustment within the sub-scanning section.

The correction of the focus deviation due to environmental variations is an essential technology for a configuration in which the imaging lens is made up of a plastic lens and the depth of focus is narrow due to the small spot size with high definition. Accordingly, the construction of this embodiment described above enables to actively correct the focus.

Like this, in this embodiment, the light source unit 1 and the first convex lens 2 having a large power are integrated as described above, and hence the interval between the light source unit 1 and the first convex lens 2 is made shorter than the front focus position of the first convex lens 2. With this configuration, the position precision becomes stable, thereby being capable of suppressing the initial focus variation and the focus variation due to temperature variation.

Further, in this embodiment, as described above, the power $\phi 2$ of the second convex lens 10 is defined by conditional expression (1), whereby the adjustment sensitivity of the second convex lens 10 is suppressed, and the focus deviation on the surface to be scanned is precisely corrected by a simple construction in the initial adjustment. In addition, the focus deviation on the surface to be scanned due to temperature change may be preferably corrected irrespective of the temperature distribution in the optical scanning apparatus.

As described above, descriptions were made of exemplary embodiments of the present invention, but the present invention is not limited to those embodiments, and various alternations and modifications may be effected within the scope of the gist.

(Color Image Forming Apparatus)

Figure 6:
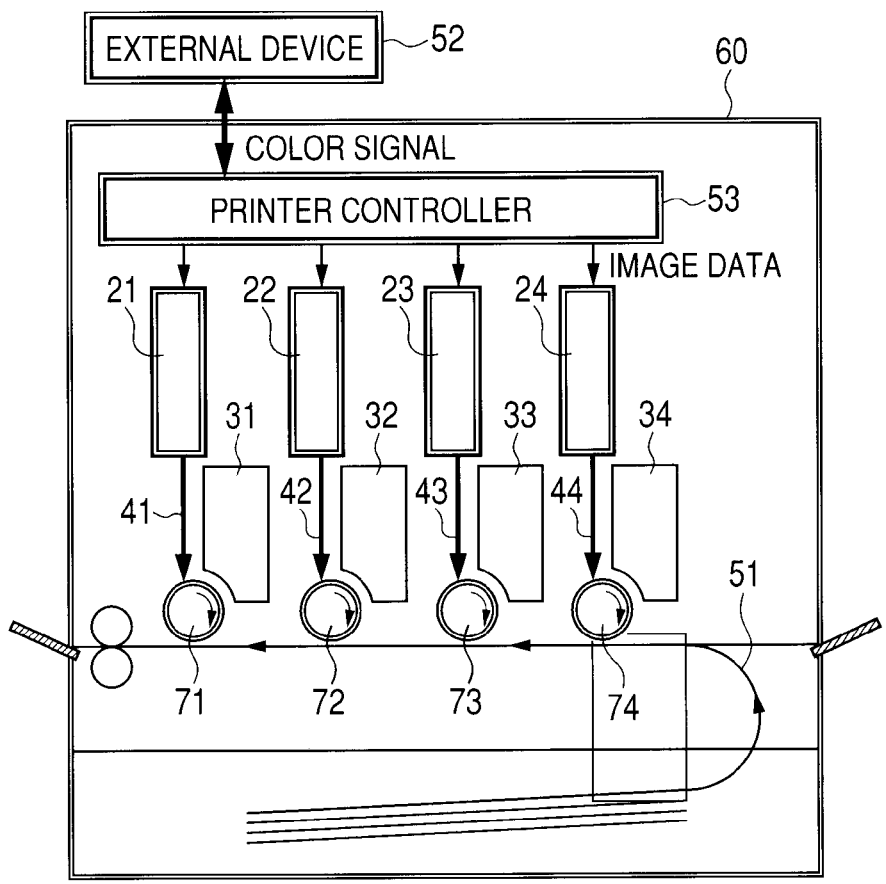
FIG. 6 is a schematic diagram illustrating a main portion of a color image forming apparatus according to an embodiment of the present invention.
Figure 7:
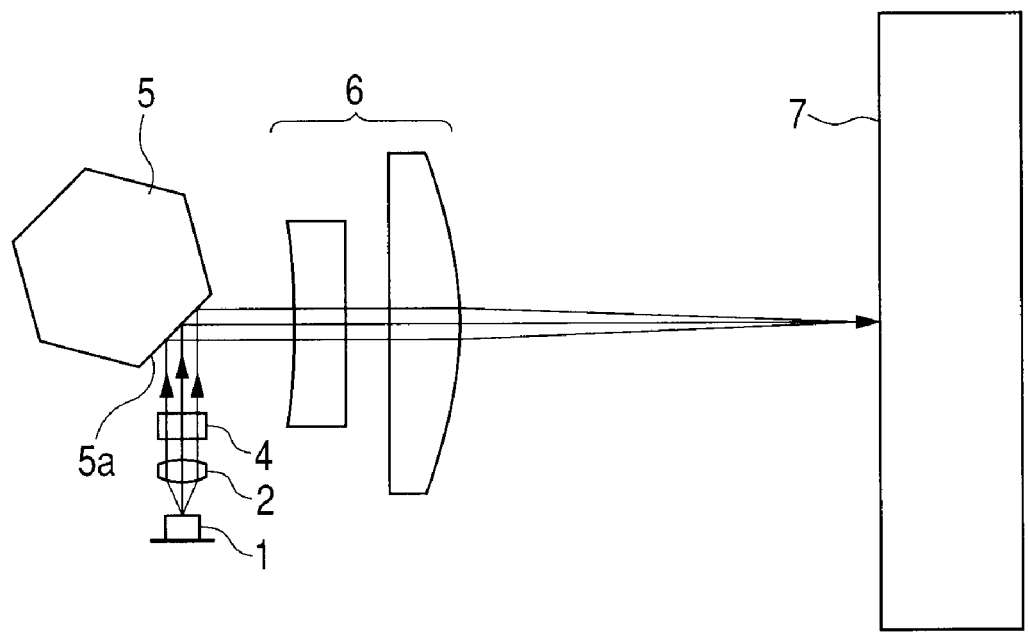
FIG. 7 is a cross-section illustrating a main portion of a conventional optical scanning apparatus.
Figure 8:
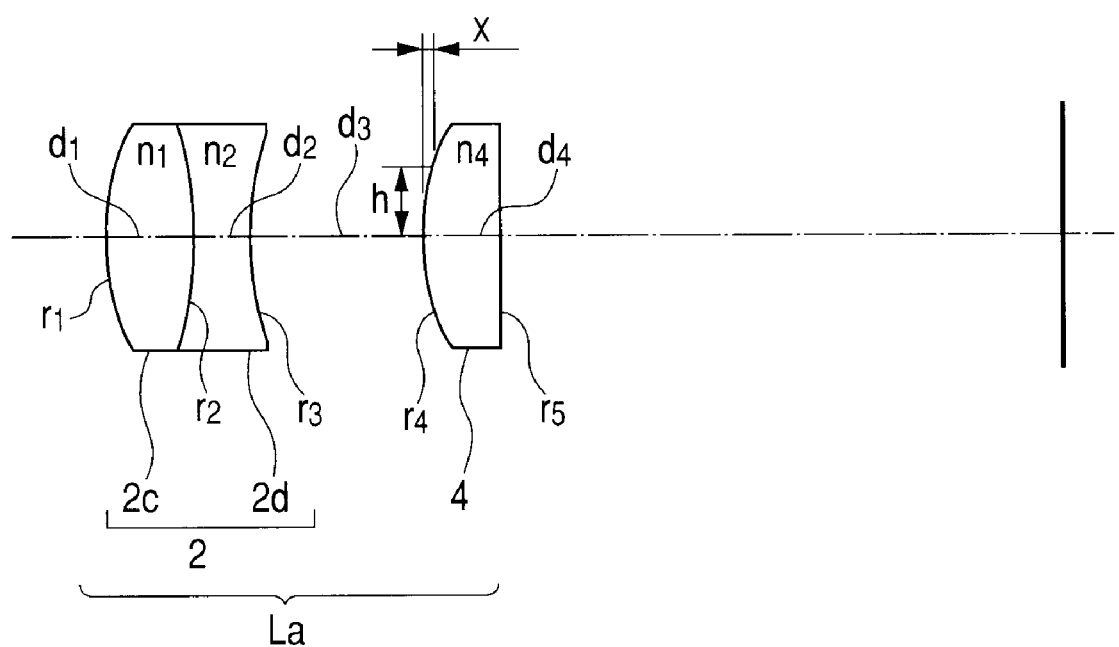
FIG. 8 is a cross-section illustrating lenses of an incident optical system of the conventional optical scanning apparatus.
Figure 9:
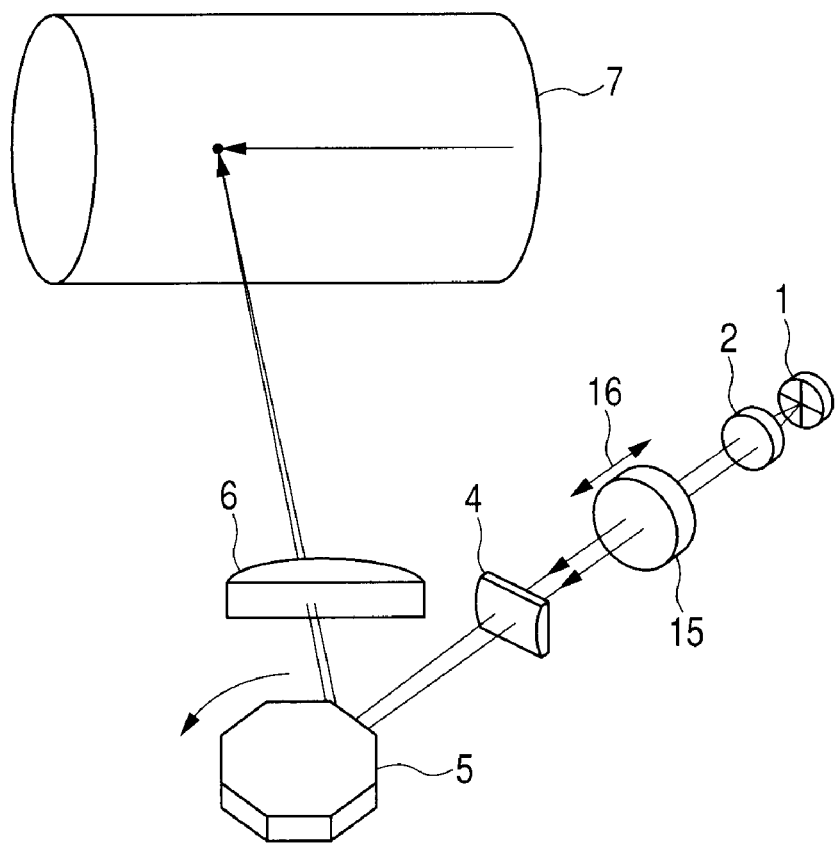
FIG. 9 is a schematic diagram illustrating a main portion of the conventional optical scanning apparatus.
Figure 10:
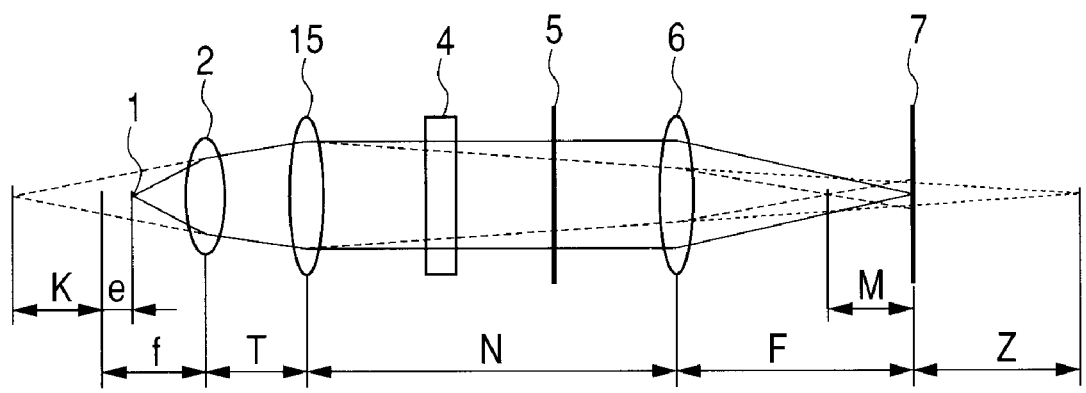
FIG. 10 is a cross-section illustrating lenses of an optical system of the conventional optical scanning apparatus.
Figure 11:
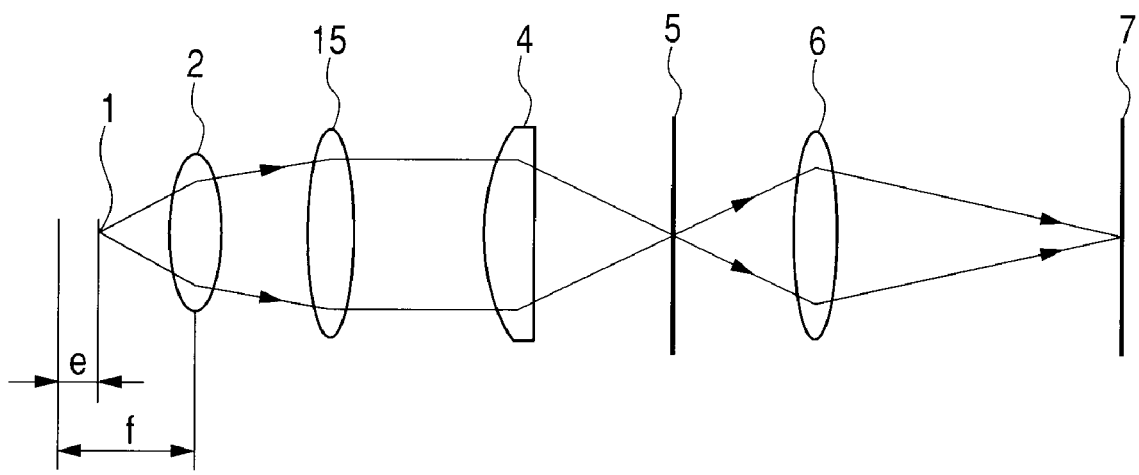
FIG. 11 is a cross-section illustrating lenses of the optical system of the conventional optical scanning apparatus.

FIG. 6 is a principal part schematic diagram showing a color image forming apparatus according to an embodiment of the present invention. This embodiment shows a tandem type color image forming apparatus in which four optical scanning apparatuses (optical scanning optical systems) are arranged to parallelly record image information on surfaces of photosensitive drums, each of which serves as an image bearing member. In FIG. 6, a color image forming apparatus 60 includes optical scanning apparatuses 21, 22, 23, and 24 each having the construction described in Embodiment 1, photosensitive drums 71, 72, 73, and 74 each serving as an image bearing member, developing units 31, 32, 33, and 34, and a transport belt 51. Note that, in FIG. 6, a transferring device (not shown) for transferring a toner image developed by a developing device to a transferring material and a fixing device (not shown) for fixing the transferred toner image to a transferring material are provided for each of the optical scanning apparatus.

In FIG. 6, respective color signals of R (red), G (green), and B (blue) are input from an external device 52 such as a personal computer to the color image forming apparatus 60. The color signals are converted into respective image data (dot data) of C (cyan), M (magenta), Y (yellow), and B (black) by a printer controller 53 in the color image forming apparatus. Those image data each are input to the optical scanning apparatuses 21, 22, 23, and 24. Light beams 41, 42, 43, and 44, which are modulated according to the respective image data, are emitted from the optical scanning apparatus. The photosensitive surfaces of the photosensitive drums 71, 72, 73, and 74 are scanned with the light beams in the main scanning direction.

According to the color image forming apparatus in this embodiment, the four optical scanning apparatuses (21, 22, 23, and 24) are arranged corresponding to the respective colors of C (cyan), M (magenta), Y (yellow), and B (black). Then, the image signals (image information) are recorded in parallel on the surfaces of the photosensitive drums 71, 72, 73, and 74, thereby printing a color image at high speed.

According to the color image forming apparatus in this embodiment, as described above, the latent images of the respective colors are formed on the corresponding surfaces of the photosensitive drums 71, 72, 73, and 74 using the light beams based on the respective image data from the four optical scanning devices 21, 22, 23, and 24. After that, the multi-transfer is performed on a recording material to produce a full color image.

As the external device 52, for example, a color image reading apparatus including a CCD sensor may be used. In this case, the color image reading apparatus and the color image forming apparatus 60 constitute a color digital copying machine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-028439, filed Feb. 10, 2009 which is hereby incorporated by reference herein in its entirety.

What is claimed is:

1. An optical scanning apparatus, comprising:
a light source unit;
an incident optical system that allows a light beam emitted from the light source unit to enter to deflecting unit; and
an imaging optical system that images the light beam deflected by the deflecting unit for scanning on a surface to be scanned,
wherein the incident optical system comprises:
a first optical system that converts the light beam emitted from the light source unit into parallel light beam; and
a second optical system that guides the light beam emitted from the first optical system onto a deflection surface of the deflecting unit,
wherein the first optical system comprises in order from the light source unit:
a first optical element having a positive power and being of rotational symmetry; and
a second optical element having a positive power with rotation symmetry,
wherein the light source unit is disposed at a position which is on the first optical element side of a front focus position of the first optical element,
wherein the light source unit and the first optical element are integrally formed,
wherein the second optical system comprises a third optical element having a power in a sub-scanning direction, and
wherein the following conditions are satisfied, $$0.04 \leq \Phi 2/\Phi \leq 0.10,$$

$$\Delta ds \leq 0.2 \times \Delta dm, \text{ and}$$

$$5 \leq (\beta m/\beta s)^2 \leq 15,$$

where $\Phi 2$ represents a power of the second optical element; $\Phi$ represents a power of the first optical system in a main scanning direction; $\beta m$ represents a magnification of entire system within a main scanning section; $\beta s$ represents a magnification of the entire system in a sub-scanning section; and $\Delta dm$ and $\Delta ds$ represent focus movement amounts within the main and sub-scanning sections on the surface to be scanned, respectively, when the second optical element is moved in the optical axis direction.

2. An optical scanning apparatus according to claim 1, wherein the first optical element, the second optical element, and the third optical element are configured to be adjustable in the optical axis direction.

3. An optical scanning apparatus according to claim 1, wherein the light source unit comprises a multi beam laser including a plurality of the light emitting portions, and the first optical element comprises an aspherical lens.

4. An optical scanning apparatus according to claim 1, wherein a spot diameter of the main scanning section on the surface to be scanned and a spot diameter of the sub-scanning section are both 50 μm or less.

5. An optical scanning apparatus according to claim 2, further comprising:
a focal point detection unit that detects focus positions within the main scanning section and the sub-scanning section on the surface to be scanned;
a first drive mechanism that moves the second optical element in the optical axis direction based on a focal point detection signal with respect to the main scanning section detected by the focal point detection unit; and
a second drive mechanism that moves the second optical system in the optical axis direction based on a focal point detection signal with respect to the sub-scanning section detected by the focal point detection unit.

6. An image forming apparatus, comprising:
the optical scanning apparatus according to claim 1;
a photosensitive member arrange on the surface to be scanned;
a developing device that develops as a toner image an electrostatic latent image formed on the photosensitive member by a light beam with which the scanning is performed by the optical scanning apparatus;
a transferring device that transfers the developed toner image onto a transferring material; and
a fixing device that fixes the transferred image onto the transferring material.

7. An image forming apparatus, comprising:
the optical scanning apparatus according to claim 1; and
a printer controller that converts code data input from an external device into an image signal, and inputs the converted image signal into the optical scanning apparatus.

* * * * *